No. 849,342. PATENTED APR. 2, 1907.
T. SWINBANK.
BICYCLE.
APPLICATION FILED MAY 7, 1906.
2 SHEETS—SHEET 1.
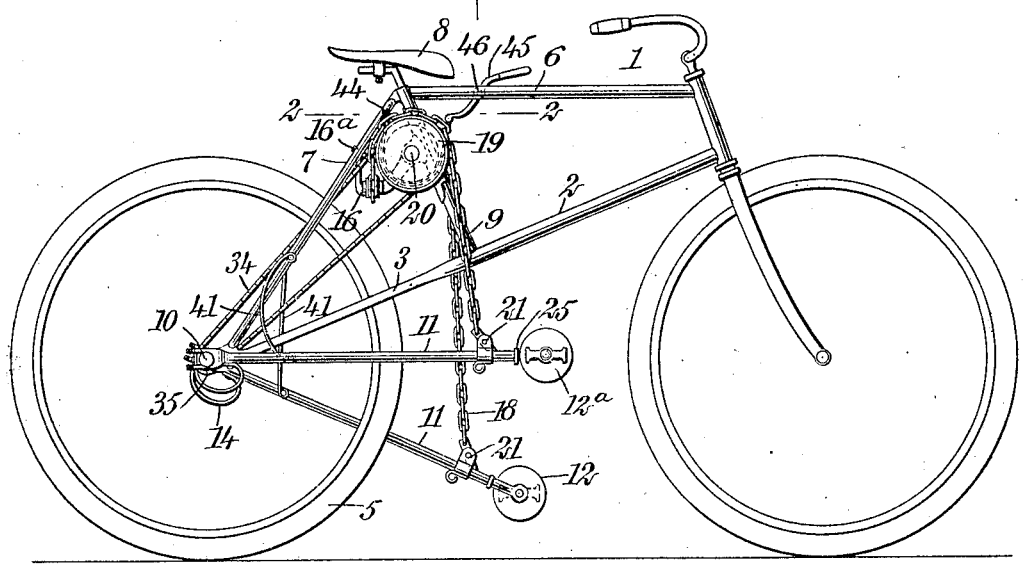
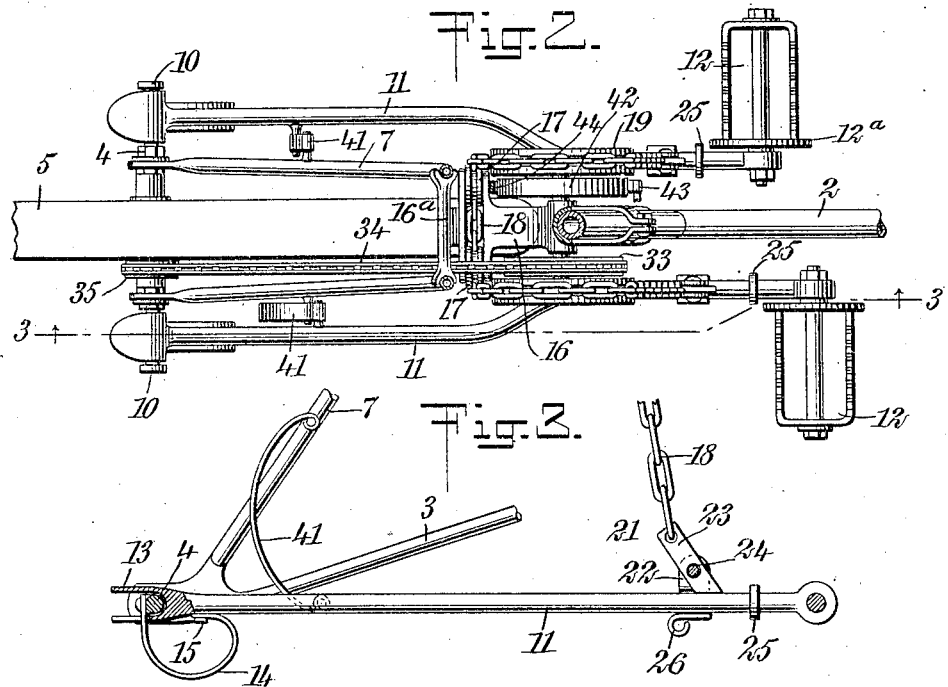
WITNESSES
INVENTOR
Thomas Swinbank
BY
ATTORNEYS No. 849,342.
PATENTED APR. 2, 1907.
T. SWINBANK.
BICYCLE.
APPLICATION FILED MAY 7, 1906.
2 SHEETS—SHEET 2.
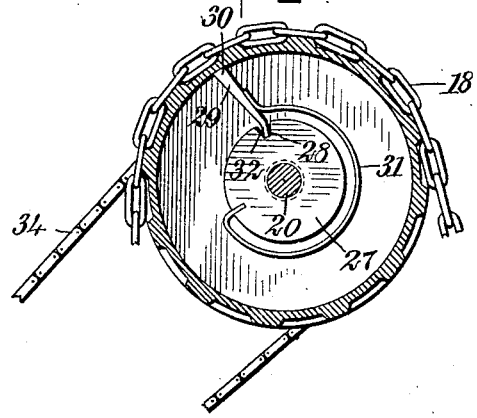
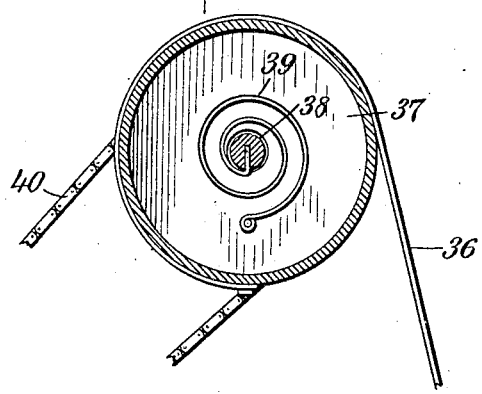
WITNESSES
INVENTOR
Thomas Swinbank
BY
ATTORNEYS

UNITED STATES PATENT OFFICE.

THOMAS SWINBANK, OF SENATH, MISSOURI.

BICYCLE.

No. 849,342.  Specification of Letters Patent.  Patented April 2, 1907.

Application filed May 7, 1906. Serial No. 315,564.

*To all whom it may concern:*

Be it known that I, THOMAS SWINBANK, a subject of the King of Great Britain, and a resident of Senath, in the county of Dunklin and State of Missouri, have invented a new and Improved Bicycle, of which the following is a full, clear, and exact description.

This invention relates to bicycles.

The object of the invention is to produce a bicycle having improved driving mechanism which will enable the driving forces to be advantageously applied to the driving mechanism.

The invention consists in the construction and combination of parts to be more fully described hereinafter, and particularly set forth in the claims.

Reference is to be had to the accompanying drawings, forming a part of this specification, in which similar characters of reference indicate corresponding parts in all the figures.

Figure 1 is a side elevation of a bicycle constructed according to my invention. Fig. 2 is a plan of the driving mechanism of the bicycle with parts in section on the line 2 2 of Fig. 1 and the forward and rear portions of the bicycle being broken away. Fig. 3 is a section on the line 3 3 of Fig. 2 and showing the lower portion of the driving mechanism. Fig. 4 is a vertical section through an oscillating wheel which constitutes a feature of the invention and by means of which the power from the pedals is transmitted to the rear wheel of the bicycle; and Fig. 5 is a view similar to Fig. 4, but representing a modified construction.

Referring more particularly to the parts, 1 represents the frame of the bicycle, which is preferably of substantially the form shown in Fig. 1, presenting an inclined main bar 2, the rear extremity whereof is formed into a rear fork 3, carrying the axle 4 and the rear wheel 5. The upper portion of the frame 1 comprises the usual horizontal bar 6, which is connected with a rear fork-brace 7 beneath the saddle 8. An inclined seat-bar 9 connects the frame just below the seat or saddle 8 with the main bar 2, the said bar 9 being disposed substantially at right angles to the bar 2, as shown. The rear axle 4 of the wheel extends beyond the rear fork-brace 7, as shown most clearly in Fig. 2, in such a manner as to form outwardly-projecting necks 10. Upon these necks I mount rocking levers 11, the forward extremities of said levers being offset inwardly and arranged to carry pedals 12 of the form shown in Fig. 2. The inner extremities of the pedals are formed with circular collars 12$^a$, which act as rollers to run upon the ground in case the pedals should strike the earth. The manner of attaching the levers 11 to the axle is very clearly shown in Fig. 3. The rear extremity of each lever is formed into a fork 13, which is applied to the forward side of the axle, as indicated. To the side of the axle remote from the lever a bowed spring 14 is attached, the same extending downwardly and forwardly, so as to form a loop under the rear axle, the forward end of the spring being attached to the under side of the lever by means of a suitable fastening device 15, as indicated. These springs 14 afford means for holding the levers against the rear axle. At the same time they permit the free up-and-down movement of the levers in a manner which will be described more fully hereinafter.

Near the upper portion of the seat-bar 9 I provide the same with a rigidly-attached bracket 16, which is clamped in position, as shown in Fig. 2. This bracket is provided with oppositely-disposed guide-pulleys 17, under which passes the loop of a chain 18. The ends of this chain run over the upper faces of oscillating pulleys 19 and hang down beyond the same, as indicated in Fig. 1. These oscillating pulleys are loosely mounted upon a transverse stub-shaft 20, which is loosely mounted in the bracket 16. The lower extremities of the free ends of the chain 18 are attached to the forward extremities of the levers 11 by means of adjustable clutches 21. The construction of one of these clutches is most clearly illustrated in Fig. 3. It comprises a sleeve 22, which may slide upon the lever, but which is normally locked thereto by the tension of the chain applied to a dog 23, which is pivotally attached at 24 to the sleeve, as shown. The dog is disposed in an inclined positon, as indicated, and its lower extremity engages the upper side of the lever. From this arrangement it should be readily understood that as long as there is tension in the chain the dog firmly grasps the lever so as to prevent sliding movement of the sleeve. At the forward extremities of the levers 11 collars 25 are formed which limit the forward movement of these clutches. The lower side of each of the sleeves 22 is formed into a downwardlyprojecting lip 26, which affords means for facilitating the sliding of the sleeves forwardly or rearwardly.

It should be understood that the rider is seated upon the saddle 8 and his feet are placed upon the pedals 12. As one pedal is depressed the opposite pedal rises, and vice versa. In this way an oscillating movement is imparted to the oscillating pulleys or wheels 19. I provide mechanism for utilizing this oscillating movement so as to impart a rotation in one direction to the stub-shaft 20. For this purpose I prefer to provide the construction shown in Fig. 4. Upon the stub-shaft I provide a rigid collar 27, which is provided in one edge with a notch 28. This collar is disposed within one of the chain-wheels 19, and a pawl 29 is provided, which is disposed in an inclined position, its outer extremity being enlarged to form a butt 30, which is seated against the inner face of the rim of the pulley. An arcuate spring 31 is rigidly attached to the collar 27 and has its front extremity attached to the pawl 29, as shown. The tendency of this spring is to produce the movement of the butt of the pawl from left to right as viewed in Fig. 4, so that the spring operates to maintain the pawl in the position shown. The inner extremity of the pawl 29 is preferably formed with a slightly-inclined tip 32, which is received in the notch 28, as shown.

With the construction described it should be understood that when the chain moves downwardly at the front, so as to impart a rotation to either of the chain-pulleys in a right-hand direction, the pawl 29, engaging the inner face of that pulley, manifests a tendency to jam, so as to prevent the face of the pulley from sliding along its butt. In this way the pawl is rotated with the chain-pulley as though integral therewith, and the rotation of the pawl is then transmitted to the hub. It should be understood that the construction described in connection with each chain-pulley is duplicated for each pulley. This rotary movement of the stub-shaft 20 is transmitted to the rear axle 4 through the medium of a main sprocket-wheel 33, over which passes a sprocket-chain 34 of any suitable form, and the rear loop of this chain passes over a small sprocket-wheel 35, attached to the hub of the rear wheel.

Instead of using a chain 18 such as that described for driving the oscillating wheels I may provide a construction such as that shown in Fig. 5. In this instance I provide straps, such as the strap 36, and these straps are attached, respectively, to the levers 11, as before. They pass around oscillating wheels 37, to which their upper extremities are attached. Each oscillating wheel 37 is connected to the fixed shaft 38 by means of a spiral spring 39, the said spring tending to rotate the wheel in a direction to wind the strap thereupon. The means described in Fig. 4 is employed for imparting a continuous rotary movement to a sprocket-wheel which is similar to the sprocket-wheel 33 and over which a chain 40 passes.

In Fig. 1 the levers 11 are shown at different elevations and in such a relation as they might assume when the bicycle is being driven. However, the levers 11 are normally held in an intermediate or mid position by means of bow-springs 21, attached, respectively, thereto and to the rear fork-brace 7, as indicated most clearly in Fig. 3. These springs act as a counterbalance for the levers, tending to move the same upwardly, and at the same time they prevent the forward extremities of the levers from digging into the earth in case the chain 18 should be accidentally broken.

In using the bicycle where the rider is about to mount a hill he can with his foot and by means of the projection 26 advance the sleeves 22 toward the axle. In this way the lever-arm of the chains is decreased and the virtual "gear" of the bicycle is diminished.

Upon the stub-shaft 20, on the left-hand side, as indicated in Fig. 2, I attach rigidly a brake-wheel 42, about which passes a brake-band 43, of flexible metal. One extremity of this band is attached to the bracket 16 at the point 44, as indicated in Fig. 1, and the forward extremity is attached to a lever 45, which is pivoted at 46 to the horizontal bar 6 of the frame. By pressing downwardly on the forward extremity of this lever the brake may be applied, as will be readily understood.

In order to prevent any tendency of the bracket 16 to move laterally, its rear extremity extends upwardly, as shown in Fig. 1, and is formed into a cross-head 16ª. The arms of this cross-head engage the rear fork-braces, as shown in Fig. 2. In this way the bracket is effectually held rigid.

Having thus described my invention, I claim as new and desire to secure by Letters Patent—

1. In a bicycle, in combination, a frame, a rear axle, levers having forks at the rear extremities thereof engaging said axle, springs connecting said levers with said axle and affording means for maintaining said levers in engagement with said axle, pedals carried by said levers, and mechanism connecting said levers with one of the wheels for driving the bicycle.

2. In a bicycle, in combination, a frame, a rear axle, levers having forks at the rear extremities thereof engaging said axle, springs attached to said axle and attached to said levers near said forks and affording means for holding said forks in engagement with said axle, flexible members attached to said levers, mechanism operated by said flexible members for driving a wheel of said bicycle, and bow-springs connecting said frame with said levers and exerting an upward pull thereupon.

3. In a bicycle, in combination, a frame, a pair of levers pivoted thereto and carrying pedals, sleeves slidably mounted on said levers, dogs pivotally mounted on said sleeves and engaging said levers, flexible members attached to said dogs respectively at points removed from the pivots thereof; and affording means for actuating said dogs to grip said levers, and mechanism actuated by said flexible members for driving said bicycle.

In testimony whereof I have signed my name to this specification in the presence of two subscribing witnesses.

THOMAS SWINBANK.

Witnesses:
CALVIN DAILY,
SAM KARNES.